Dec. 17, 1957 H. O. SCHUMANN 2,816,633
AUTOMATIC PARKING BRAKE
Filed June 29, 1954
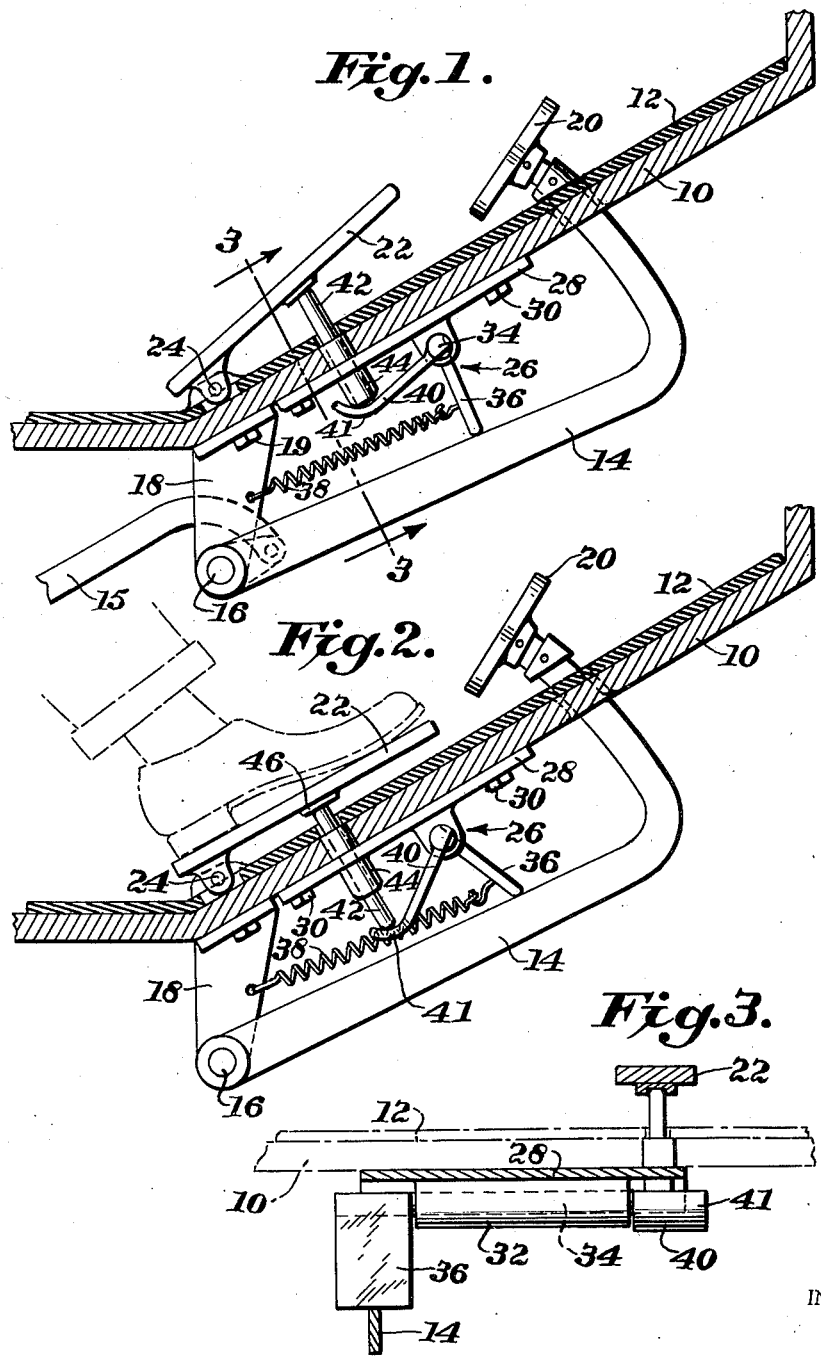
INVENTOR:
Herbert O. Schumann,
BY Cushman, Darby & Cushman
ATTORNEYS.

2,816,633

AUTOMATIC PARKING BRAKE

Herbert O. Schumann, New Braunfels, Tex., assignor to N. A. Saigh, San Antonio, Tex., doing business as New Braunfels Iron Works, New Braunfels, Tex.

Application June 29, 1954, Serial No. 440,085

3 Claims. (Cl. 192—2)

My invention relates to a brake holder for automotive vehicles and the like and more particularly to a brake holder which is adapted to be automatically released by actuation of an accelerator pedal.

While my invention is capable of broad utility, it is particularly adapted for use with electrically operated automotive vehicles such as are employed on golf courses to carry the players and their clubs around the course. Such vehicles are generally provided with a brake pedal for actuating the brake and an accelerator pedal for actuating the electric power to drive the vehicle. During use these vehicles must be constantly stopped and started. For example, when the player is ready to make a shot on the fairway, it is necessary to stop the vehicle, to get out and make the shot, and then get back in the vehicle and proceed further. Quite often this procedure will occur on hills and while the vehicles may be provided with a conventional hand brake, repeated use of such hand brakes is a constant bother. Moreover, since there is no particular need of applying the handbrake on level ground, the operator may forget to apply it when the vehicle is on a hill and serious damage may result.

Consequently, the primary object of my invention is the provision of a brake locking mechanism which is adapted to automatically move into locked position when the vehicle brake is moved into its substantially fully extended position and to be automatically released from its locked position by actuation of the accelerator pedal so to substantially overcome the difficulties mentioned above.

Another object of my invention is the provision of a brake locking mechanism for an automotive vehicle which is simple in construction and may be quickly applied and released without the necessity of any hand operation.

These and other objects of my invention will become more apparent during the course of the following specification and appended claims.

My invention may best be understood with reference to the accompanying drawings wherein an illustrative embodiment is shown.

In the drawings:

Figure 1 is a front elevational view partly in section of a brake locking mechanism embodying the principles of my invention showing the parts in their brake locking position;

Figure 2 is a view similar to Figure 1 showing the parts in their accelerator pedal releasing position; and Figure 3 is a cross sectional view taken on the line 3—3 of Figure 1.

Referring now more particularly to the drawings, I have illustrated one embodiment of my invention as applied to an automotive vehicle of the electrical type suitable for use on golf courses. The automotive vehicle includes a floor board 10 having a rubber mat 12 covering the upper surface thereof. The vehicle further includes a brake arm 14 which is pivoted beneath the floor board 10, as at 16, on a bracket 18 which in turn is suitably secured, as by bolts 19, to the underside of the floor board. The forward end of the brake arm 14 is preferably arcuately curved about the pivot 16 as a center with its upper free end extending through a suitable aperture in the floor board. A foot pedal 20 is preferably provided on the upper free end of the arcuate portion of the brake arm 14. The brake arm 14 is adapted to actuate a suitable brake mechanism on the vehicle, part of which is shown at 15 in Figure 1. The vehicle is also provided with an accelerator pedal 22 which is suitably mounted for movement relative to the floor board, as by pivot pin 24. The accelerator pedal is adapted to be connected to an electrical system (not shown) for propelling the vehicle.

It will be understood that the above structure is of a conventional nature and forms no part of my invention. My invention relates to a brake holding or locking mechanism 26 which is adapted to be mounted on the vehicle to cooperate with the brake arm 14 and accelerator pedal 22 so as to be actuated automatically thereby. The brake locking mechanism, generally indicated at 26, comprises a rectangular base plate 28 which is adapted to be secured to the underside of the floor board 10 by suitable securing means, such as screws 30. The base plate 28 has mounted centrally thereof, a transverse sleeve or bearing 32 within which a shaft 34 is rotatably mounted.

Mounted on one end of the shaft 34 is a locking element 36 which is suitably secured at its inner end, as by welding or the like, to the shaft 34 and has its outer end disposed in sliding engagement with the brake arm 14. A spring 38 is secured between the locking element 36 and the bracket 18 to bias the locking element into engagement with the brake arm.

The opposite end portion of the shaft 34 has mounted thereon an elongated cam member 40 which is suitably secured at its inner end, as by welding or the like, to the shaft. The outer end of the cam member 40 is preferably curved, as at 41, so as to receive the lower end of a pin or plunger 42. The plunger 42 is slidably mounted in a sleeve 44, provided on the underside of the base plate 28, and extends upwardly through the floor board 10 into the path of movement of the accelerator pedal 22. A suitable boss 46 is preferably provided on the underside of the accelerator pedal 22 which is adapted to engage the upper end of the plunger 42.

As was stated above, during the use of a vehicle of the type described, it is necessary to stop the vehicle and hold it in a brake locked condition during the time in which the golfer makes his shot. With the present invention, the brakes are automatically held in a locked condition when the vehicle is brought to a full stop. After the shot has been made and it is desired to proceed further in the vehicle, movement of the accelerator pedal will automatically release the brake from its locked condition.

With the above in mind, the brake locking mechanism of my invention operates as follows: When the brake is applied by the operator to stop the vehicle, the brake arm 14 is moved into substantially its fully extended position as the operator steps on the pedal 20. As the brake arm moves downwardly, as viewed in Figure 1, the locking element 36 is biased by spring 38 into a position wherein it is disposed substantially perpendicularly to the brake arm. As illustrated in Figure 1, the brake arm is thus held in its brake applying position, since the disposition of the locking element positively prevents upward movement thereof. When it is desired to proceed further in the vehicle, the operator steps on the accelerator pedal 22, as shown in Figure 2, and the initial movement of the pedal will cause the plunger 22 to move downwardly which in turn, by virtue of the engagement of the outer curved end 41, will move cam member 40. Since the cam member is rigidly secured to the shaft 34 which rigidly carries the locking element, the latter will be rotated out of its perpendicular locking position with respect to the brake arm, permitting the brake arm to return to its normal inoperative position by a suitable biasing means not shown.

It is to be noted that when the accelerator pedal is not depressed, the locking element 36 is normally in sliding engagement with the brake arm 14 and that it will not become effective to lock the brake arm 14 against movement except when it is disposed substantially perpendicularly to the brake arm. In order for the locking element to move into its perpendicular position, the brake arm 14 must first be moved into its substantially fully extended position. Thus, the brake arm is free to operate in a normal brake applying range wherein the locking element will be ineffective. For example, as the vehicle is normally proceeding, the brake may be applied to slow down the movement of the vehicle and it will be normally returned so long as it is not substantially fully extended. Moreover, since the accelerator pedal is normally depressed after the brake has been actuated to merely slow down the vehicle, even if the locking element were to move into its substantially perpendicular locking position, movement of the accelerator pedal would thereby release the brake arm.

It can be seen that I have provided a brake locking mechanism which is automatically moved into its brake locking position when the brake is substantially fully extended to bring the vehicle to a complete halt and which is automatically released from its locking position by the movement of the accelerator pedal to start the vehicle.

While I have disclosed my invention as being particularly adapted for use on automotive vehicles of the type employed on golf courses, it will be readily understood that the invention is capable of broad utility with any automotive vehicle provided with a braking mechanism and an accelerator pedal.

It is also to be understood that the form of the invention herewith shown and described is to be taken as the preferred embodiment of the same, and that various changes may be resorted to without departing from the spirit of the invention or the scope of the appended claims.

I claim:

1. In an automotive vehicle having an accelerator pedal and a brake arm, a rotatable shaft, a locking element extending outwardly from said shaft, said locking element having its outer end slidably engaging said brake arm, means for biasing said locking element into sliding engagement with said brake arm so that movement of the latter will cause said locking element to move, said locking element being movable into a position substantially perpendicular to said brake arm when the latter is moved into its substantially fully extended brake applying position so as to lock said brake arm against movement, and means operatively connected between said accelerator pedal and said shaft for moving said locking element out of its perpendicular position upon movement of said accelerator pedal.

2. In an automotive vehicle as defined in claim 1, said last mentioned means comprising an arm extending outwardly from said shaft, and an elongated member having one of its ends disposed in the path of movement of said accelerator pedal and its other end operatively connected with said arm.

3. In an automotive vehicle as defined in claim 1, said last mentioned means comprising an arm on said shaft having a curved outer end, said arm being axially spaced from said locking element and extending at an angle with respect thereto, and a slidably mounted member having one of its ends disposed in the path of movement of said accelerator pedal and its other end slidably engaging said curved outer end of said arm.

References Cited in the file of this patent
UNITED STATES PATENTS

| | | |
|---|---|---|
| 1,876,498 | Hawkins | Sept. 6, 1932 |
| 2,007,593 | Brown | June 9, 1935 |
| 2,072,666 | Cartwright | Mar. 2, 1937 |
| 2,093,938 | Stahl | Sept. 21, 1937 |